United States Patent
Hutson

(10) Patent No.: US 9,376,152 B2
(45) Date of Patent: Jun. 28, 2016

(54) MULTI-AXIS MOTORIZED WHEEL

(71) Applicant: QUALCOMM Incorporated, San Diego, CA (US)

(72) Inventor: Donald Bolden Hutson, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/485,395

(22) Filed: Sep. 12, 2014

(65) Prior Publication Data

US 2015/0251715 A1 Sep. 10, 2015

Related U.S. Application Data

(60) Provisional application No. 61/948,467, filed on Mar. 5, 2014.

(51) Int. Cl.
| | |
|---|---|
| *B60K 7/00* | (2006.01) |
| *B62D 61/00* | (2006.01) |
| *G05D 1/02* | (2006.01) |
| *B25J 5/00* | (2006.01) |
| *B60K 17/04* | (2006.01) |
| *B60K 17/356* | (2006.01) |

(52) U.S. Cl.
CPC ............... *B62D 61/00* (2013.01); *B25J 5/007* (2013.01); *B60K 7/0007* (2013.01); *B60K 17/043* (2013.01); *B60K 17/356* (2013.01); *G05D 1/021* (2013.01); *B60K 2007/003* (2013.01); *B60K 2007/0084* (2013.01); *Y10S 901/01* (2013.01)

(58) Field of Classification Search
USPC ............. 180/21, 22, 210, 211, 215, 218, 219, 180/220, 222, 223, 224, 230, 11, 12, 252, 180/253, 264, 266, 65.6, 65.7; 901/1; 301/3.5
See application file for complete search history.

(56) References Cited

U.S. PATENT DOCUMENTS

| | | | | |
|---|---|---|---|---|
| 4,174,762 A | * | 11/1979 | Hopkins | ................ B62D 11/18 180/6.44 |
| 4,683,973 A | | 8/1987 | Honjo et al. | |
| 5,068,943 A | * | 12/1991 | Estkowski | .......... B60B 33/0028 16/18 A |

(Continued)

FOREIGN PATENT DOCUMENTS

| | | |
|---|---|---|
| DE | 102004005869 A1 | 9/2005 |
| DE | 102008015825 A1 | 10/2009 |

(Continued)

OTHER PUBLICATIONS

International Search Report and Written Opinion—PCT/US2015/017818—ISA/EPO—May 29, 2015.

*Primary Examiner* — Thomas Tarcza
*Assistant Examiner* — Richard Goldman
(74) *Attorney, Agent, or Firm* — Seyfarth Shaw LLP

(57) ABSTRACT

A robotic device includes a drive pod defined between multiple wheels coupled to an axle of the drive pod. The robotic device further includes a single mounting shaft coupled to the drive pod and configured to couple the drive pod with a body of the robotic device. The robotic device also includes multiple first motors defined within the drive pod and configured to control multiple first drive gears coupled to a drive shaft gear of the drive pod. The robotic device still further includes a second motor defined within the drive pod and configured to control a second drive gear coupled to a carousel gear of the drive pod.

14 Claims, 6 Drawing Sheets

(56) References Cited

U.S. PATENT DOCUMENTS

| | | | | |
|---|---|---|---|---|
| 5,535,843 | A | * | 7/1996 | Takeda ................... B62D 15/00 180/200 |
| 5,549,175 | A | * | 8/1996 | Torii ....................... B60G 3/00 180/209 |
| 6,145,611 | A | * | 11/2000 | Haddad, Sr. ............. B60K 1/00 180/11 |
| 6,491,127 | B1 | * | 12/2002 | Holmberg ............ B60K 7/0007 180/21 |
| 8,424,627 | B2 | | 4/2013 | Kuo et al. |
| 8,590,664 | B2 | | 11/2013 | Terashima et al. |
| 2002/0036106 | A1 | * | 3/2002 | Hanyu ..................... B60K 6/26 180/65.235 |
| 2005/0061570 | A1 | | 3/2005 | McVicar et al. |
| 2007/0080000 | A1 | * | 4/2007 | Tobey ..................... A61G 5/045 180/21 |
| 2008/0246241 | A1 | * | 10/2008 | Mollhagen ................ B60G 3/14 280/124.106 |
| 2012/0316701 | A1 | * | 12/2012 | Thielman ................ B62D 57/00 701/2 |
| 2015/0251715 | A1 | * | 9/2015 | Hutson ................... B62D 61/00 701/22 |

FOREIGN PATENT DOCUMENTS

| | | |
|---|---|---|
| EP | 2444301 A1 | 4/2012 |
| FR | 2893298 A1 | 5/2007 |
| JP | 2006001518 A | 1/2006 |
| JP | 5228156 B2 | 7/2013 |

* cited by examiner

MULTI-AXIS MOTORIZED WHEEL

CROSS-REFERENCE TO RELATED APPLICATION

This application claims the benefit under 35 U.S.C. §119(e) to U.S. Provisional Patent Application No. 61/948,467, filed on Mar. 5, 2014, in the name of Donald Bolden HUTSON, the disclosure of which is expressly incorporated by reference herein in its entirety.

BACKGROUND

1. Field

Certain aspects of the present disclosure generally relate to vehicles, and more particularly, to systems and methods for controlling the locomotion of a vehicle via independently controlled multi-axis wheels.

2. Background

Various wheel arrangements have been developed to improve the maneuverability of vehicles. A conventional vehicle with independent wheels, such as a car, uses Ackerman steering to turn. Ackerman steering is desirable when paired with a front or rear wheel differential. Still, Ackerman steering is not desirable for use with vehicles that turn in place.

In some cases, treads, such as tank treads, may provide locomotion to a vehicle. The treads may be desirable for all terrain traction, but are inefficient for turning in place. That is, to follow a curved path, the conventional treaded vehicle uses a skid steer to rotate. Still, when used indoors or on fragile surfaces, the treads may damage the surface.

In other cases, vehicle drive systems, such as a drive system used for a robot, may use a multi-axis rotation that allows each wheel to drive in a forward and/or reverse direction and also to rotate in place. Such wheels may also be referred to as wild swerve wheels. The multi-axis wheels are similar to actuator driven caster wheels, such as the wheels of a shopping cart or office chair. Still, conventional multi-axis wheels are not independently operated.

In some cases, vehicle drive systems may use a multi-axis rotation. That multi-axis rotation drives each wheel in a forward and/or reverse direction and also rotates each wheel in place. The multi-axis wheels may be referred to as wild swerve wheels. The multi-axis wheels are similar to actuator driven caster wheels, such as the wheels of a shopping cart or office chair. Conventional wheels, such as actuator driven caster wheels, are not independently operated. Thus, it is desirable to provide independent multi-axis wheels so that a vehicle may move in various directions, such as forward, backwards, rotate left, rotate right, strafing left, and strafing right.

SUMMARY

In one aspect of the present disclosure, a robotic device is disclosed. The robotic device includes a drive pod defined between multiple wheels coupled to an axle of the drive pod. The robotic device further includes a single mounting shaft coupled to the drive pod and configured to couple the drive pod with a body of the robotic device. The robotic device also includes multiple first motors defined within the drive pod and configured to control multiple first drive gears coupled to a drive shaft gear of the drive pod. The robotic device still further includes a second motor defined within the drive pod and configured to control a second drive gear coupled to a carousel gear of the drive pod.

In another aspect of the present disclosure, a method for controlling a robotic device is disclosed. The method includes controlling multiple first motors within a drive pod to control multiple first drive gears coupled to a drive shaft gear of the drive pod. The method also includes controlling a second motor within the drive pod to control a second drive gear coupled to a carousel gear of the drive pod. In one configuration, the drive pod is disposed between multiple wheels and coupled to the robotic device via a single mounting shaft.

Yet another aspect of the present disclosure is directed to an apparatus including means for controlling multiple first motors within a drive pod to control multiple first drive gears coupled to a drive shaft gear of the drive pod. The apparatus also includes means for controlling a second motor within the drive pod to control a second drive gear coupled to a carousel gear of the drive pod. In one configuration, the drive pod is disposed between multiple wheels and coupled to the robotic device via a single mounting shaft.

Still yet another aspect of the present disclosure is directed to an apparatus for controlling a robotic device, the apparatus having a memory and one or more processors coupled to the memory. The processor(s) is configured to control multiple first motors within a drive pod to control multiple first drive gears coupled to a drive shaft gear of the drive pod. The processor(s) is also configured to control a second motor within the drive pod to control a second drive gear coupled to a carousel gear of the drive pod. In one configuration, the drive pod is disposed between multiple wheels and coupled to the robotic device via a single mounting shaft.

In another aspect of the present disclosure, a computer program product for controlling a robotic device is disclosed. The computer program product having a non-transitory computer-readable medium with non-transitory program code recorded thereon. The program code including program code to control multiple first motors within a drive pod to control multiple first drive gears coupled to a drive shaft gear of the drive pod. The program code also including program code to control a second motor within the drive pod to control a second drive gear coupled to a carousel gear of the drive pod. In one configuration, the drive pod is disposed between multiple wheels and coupled to the robotic device via a single mounting shaft.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
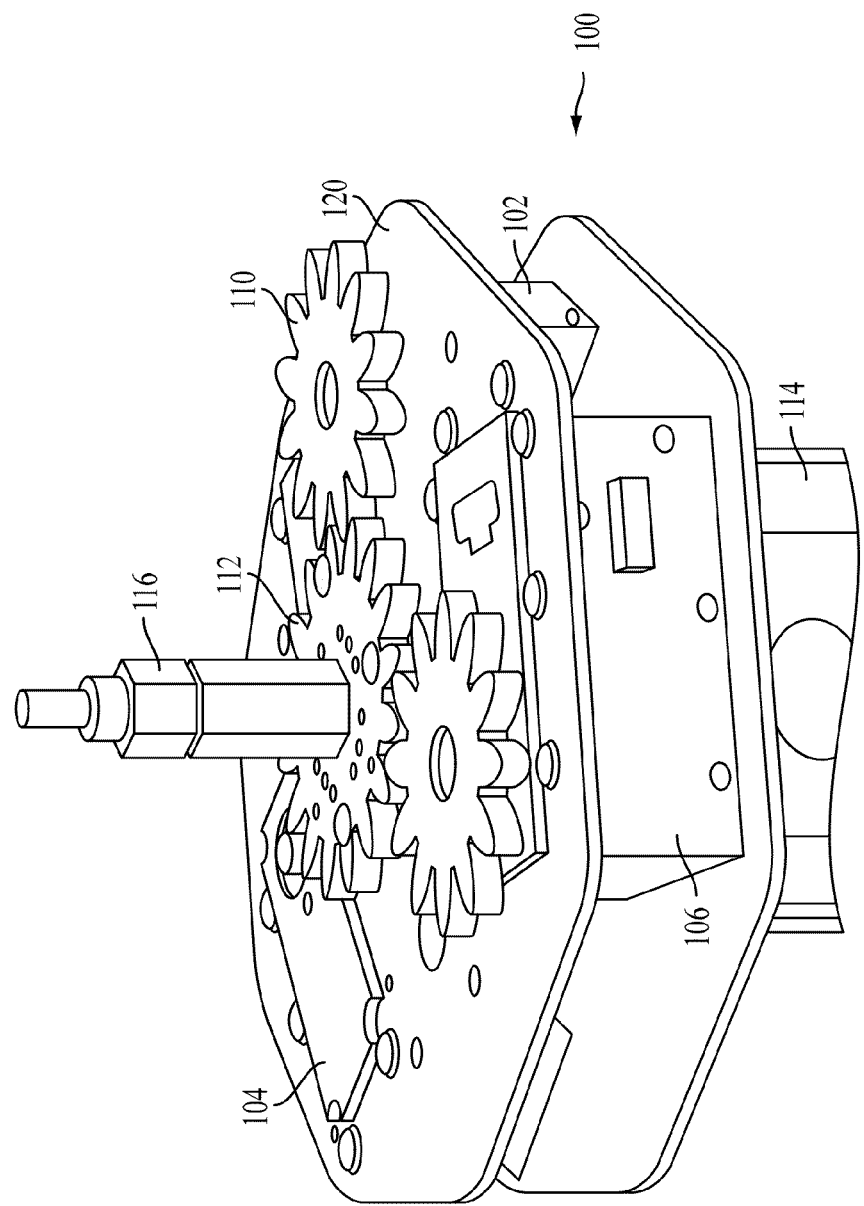
FIGS. 1-3 illustrate examples of an independent wild swerve drive pod according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to a vehicle, such as a robot, with multiple wheels. In one configuration, the vehicle includes three wheels controlled by a computer, or other device, so that the vehicle can drive in various directions about a horizontal plane. The heading and the variable speed of each wheel can be independently controlled so that the wheel may provide independent locomotion and serve as a drive wheel. As previously discussed, the three wheel configuration allows a vehicle to move in various direction, such as forward, backwards, rotate left, rotate right, strafing left, and strafing right. It should be noted that aspects of the present disclosure are not limited to a three wheeled vehicle and other wheel configurations are contemplated As noted above, the wheels of a conventional wild swerve system are not independently driven. More specifically, the wheels of the conventional wild swerve system are not internally driven as a standalone system. That is, due to various reasons, such as commutation complexity and/or mechanical complexity, the electronics and control motors of a conventional wheel of a wild swerve system are driven from outside of the wheel and the rotation axles are driven from a single motor. Without independent control of each wheel in both drive direction and heading direction the vehicle may have limited movement. Furthermore, the vehicle may move in a particular direction with wheel scrub. As an example, wheel scrub may occur when carpet bunches up due to a tank turning on a loose carpet.

Aspects of the present disclosure are directed to an independent wild wheel swerve system. In one configuration, the electronics and control motors of each wheel are defined within the wheel. More specifically, the wheel rotation (i.e., forward and/or reverse rotation) and rotation axis (i.e., right and/or left rotation) of each wheel is driven from one or more motors defined within the wheel.

In one configuration, two motors are specified to control the forward and/or reverse rotation of each wheel. Moreover, in the present configuration, another motor is defined within the wheel to control the right and/or left rotation of the carousel. In one configuration, the carousel is coupled to a housing defined between the wheels. The carousel housing may be referred to as a drive pod. The right and/or left rotation of the carousel also causes to wheels and housing to move in the right and/or left direction.

Although aspects of the disclosure specify two motors for controlling the forward and/or reverse rotation of each wheel and one motor to control the right and/or left rotation of the carousel, the present disclosure is not limited to the specific number of motors, of course, more or less motors may be specified as desired.

In one configuration, the motors, electronics, bearings, miter gears, mounting frame system, and/or other components are coupled to a housing defined within the wheel. Thus, based on the aspects of the present disclosure the replacement/swapping of each wheel for repair/maintenance is improved in comparison to a conventional wheel.

Furthermore, in one configuration the drive pod can continuously rotate in both axes (X and Y). The continuous rotation provides a reduced path to a desired direction as the wheel can change a direction of the wheel rotation instead of rotating a full 180 degrees to a new heading. Aspects of the present disclosure may use off the shelf servos and/or any combination of motors sensors and electronics.

FIG. 1 illustrates an example of an independent wild swerve drive pod 100 according to an aspect of the present disclosure. The independent wild swerve drive pod 100 may be referred to as a drive pod. As shown in FIG. 1, three motors 102, 104, 106 may be defined within a housing 120. A drive gear 110 may be coupled to each motor 102, 104, 106. As shown in FIG. 1, the drive gears 110 of the first motor 102 and a third motor 106 are defined on a first surface of the housing 120 that includes the drive shaft gear 112. The drive gear (not shown) of the second motor 104 may be defined on a second surface of the housing 120 that is different from the first surface of the drive pod 100.

The drive gears 110 of the first motor 102 and the third motor 106 rotate the drive shaft gear 112 of the drive shaft 116. As shown in FIG. 1, the drive shaft 116 may be a hex shaft. Moreover, the drive gear of the second motor 104 may rotate the carousel 114. That is, the drive gear 110 of the second motor 104 is specified to drive a carousel gear (not shown) that rotates the carousel 114 right and/or left. The carousel 114 houses the axle (not shown) for the wheels (not shown). Furthermore, the drive gears 110 of the first motor 102 and the third motor 106 rotate the wheels in a forward and/or reverse direction via the drive shaft 116. The carousel 114 rotates independently of the housing 120. That is, in one configuration, the housing 120 is stationary while the carousel 114 rotates in a right and/or left direction.

Furthermore, as shown in FIG. 1 the drive shaft 116 extends in a vertical direction from the drive pod 100. More specifically, although not shown in FIG. 1, the drive pod 100 is configured to be defined between the wheels that are coupled to the axle of the drive pod such that only the drive shaft 116 extends beyond or substantially parallel to the plane of the wheels. The drive shaft 116 may be coupled to a single mounting shaft (not shown) that is used to couple the drive pod 100 with an arm (not shown) of the robot.

In another configuration, the single mounting shaft is coupled directly to the drive pod. In one configuration, the wiring to control the motors and/or gears of the robot is fed through the single mounting shaft. Furthermore, a release mechanism may be defined on the single mounting shaft so that the drive pod may be released from the arm of the robot via the release mechanism.

Figure 2:
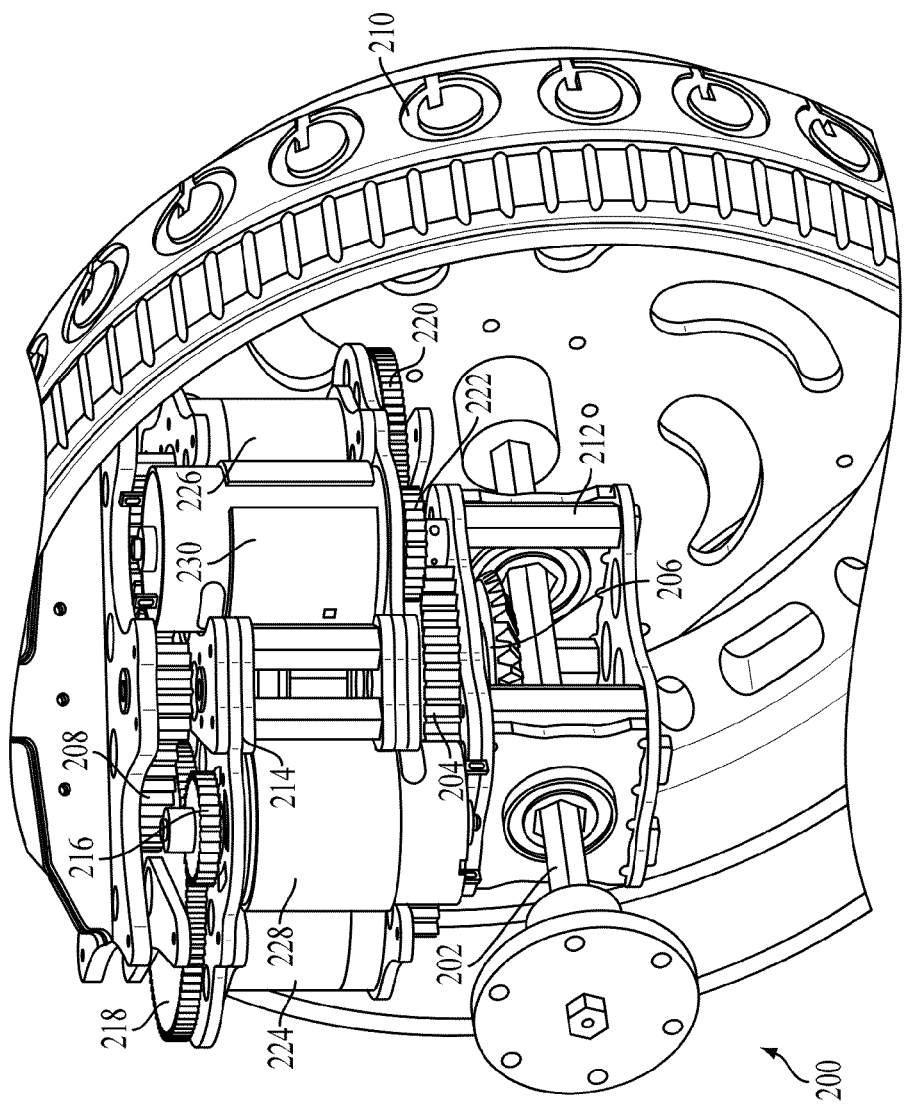

FIG. 2 illustrates a drive pod 200 according to an aspect of the present disclosure. As shown in FIG. 2, the drive pod 200 may include a housing 214 and a carousel 212 coupled to the housing 214. In one configuration, the housing 214 is used to house multiple gear boxes 224, 226 and motors 228, 230. The motors 228, 230 and gear boxes 224, 226 are coupled to various gears 216, 218, 220, 222. For example, the first motor 228 drives a first drive gear 216. The first drive gear 216 may be coupled with a first gear box gear 218 that is coupled to the first gear box 224. The gear boxes 224, 226 may provide different gear arrangements to control the speed and/or the torque of the wheel. As previously discussed, some of the gears 216, 218, 220, 222 defined within the housing 214 drive the drive shaft gear 208 of the drive shaft (not shown). The drive shaft is coupled to a differential 206.

As shown in FIG. 2, the differential 206 is housed within the carousel 212 and drives the axle 202 that is coupled to the wheels 210. That is, the first motor 228 and one or more other motors (not shown) drive the drive shaft that drives the axle 202 so that the wheels 210 may move forward and/or backward. The drive shaft is driven via a drive shaft gear 208 that is coupled to the housing 214.

Furthermore, as shown in FIG. 2, the drive pod 200 may also include a second motor 230 defined in the housing 214. The second motor 230 drives a second drive gear 222. In one configuration, the second drive gear 222 is coupled to a second gear box gear 220 of a second gear box 226. The second gear box gear 220 may be used in conjunction with the second drive gear 222 to control the speed and/or torque of the rotation of the carousel gear 204 of the carousel 212. Moreover, the second gear box gear 220 drives the carousel gear 204 of the carousel 212 so that the carousel 212 may move in a right and/or left direction. The movement of the carousel 212 causes the drive pod 200 to rotate right and/or left.

Figure 3:
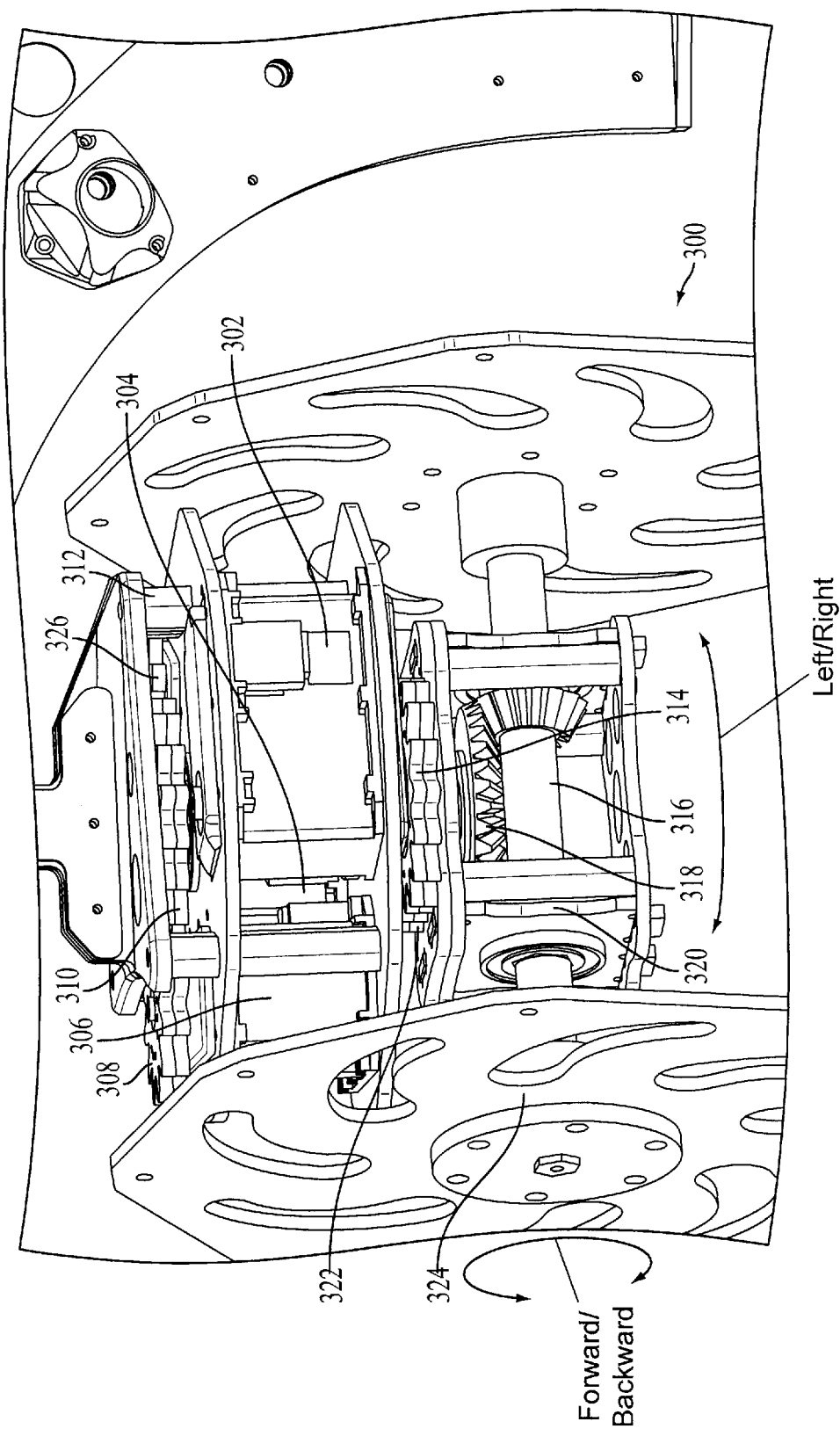

FIG. 3 illustrates a drive pod 300 according to an aspect of the present disclosure. As shown in FIG. 3, the drive pod 300 may include a housing 312 and a carousel 320 coupled to the housing 312. In one configuration, the housing 312 houses multiple motors 302, 304, 306 that are coupled to various drive gears 308, 314, 326.

In one configuration, the first motor 302 is specified to drive a first drive gear 314. The first drive gear 314 may be coupled with a carousel gear 322 that is coupled to the carousel 320. The first drive gear 314 drives the carousel gear 322 so that the carousel 320 may rotate in a right and/or left direction, as indicated in the directional arrow of FIG. 3.

The carousel 320 also houses the axle 316 that is coupled to the wheels 324. Furthermore, the carousel 320 houses the differential 318 that is coupled to the axle 316 and the drive shaft (not shown). As previously discussed, some of the drive gears 308, 326 defined within the housing 312 drive the drive shaft gear 310 of the drive shaft (not shown) that is coupled to a differential 318. The differential 318 is specified to drive the axle 316 that is coupled to the wheels 324. That is, the second motor 304 and the third motor 306 provide rotation to the drive shaft that drives the axle 316 so that the wheels 324 may move in a forward or backward direction as shown in the directional arrows of FIG. 3. The drive shaft is driven via a drive shaft gear 310 that is coupled to the housing 312. More specifically, a second drive gear 326 of the second motor 304 and a third drive gear 308 of the third motor 306 are coupled to the drive shaft gear 310.

Figure 4:
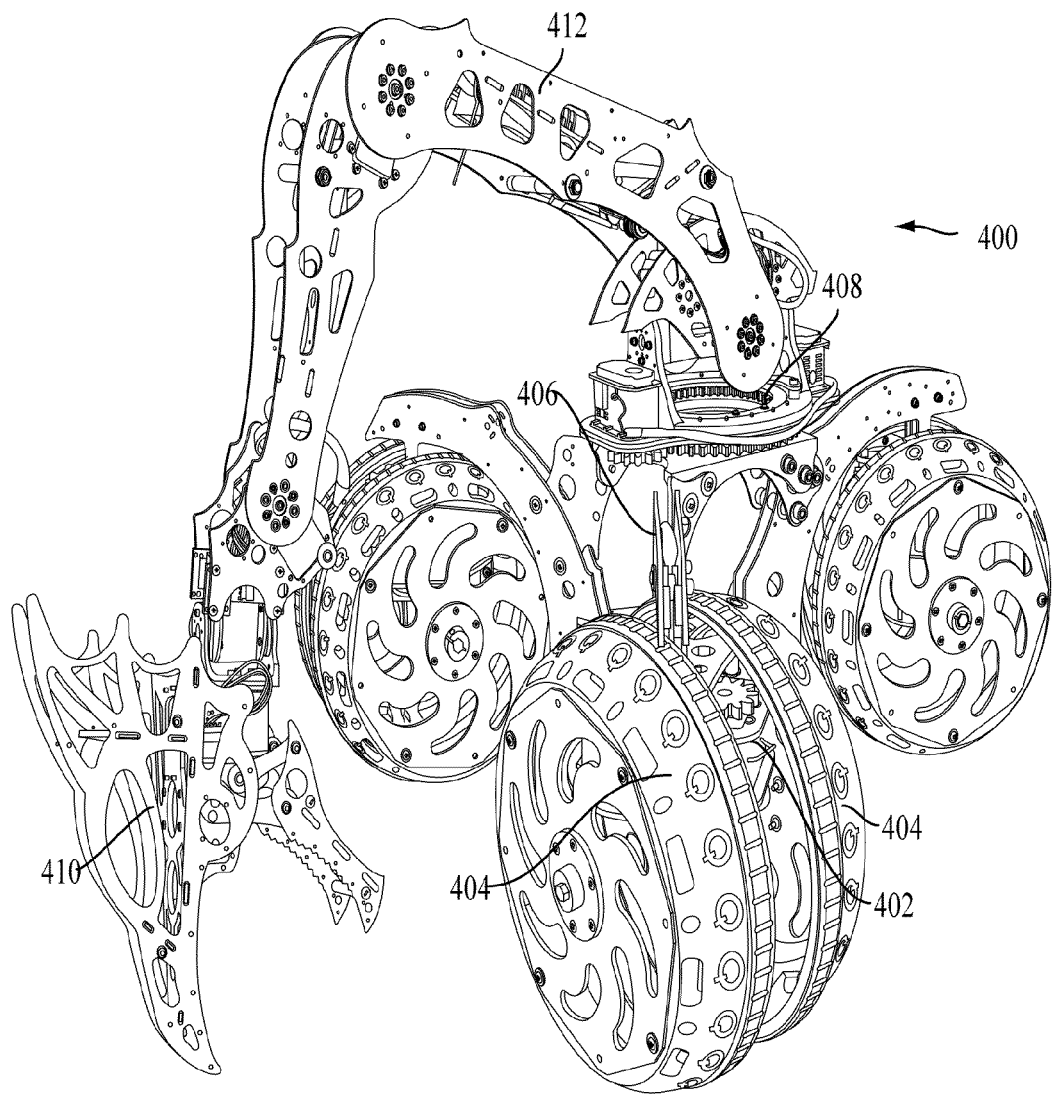
FIG. 4 illustrates a vehicle with independent wild swerve drive pods according to an aspect of the present disclosure.

FIG. 4 illustrates an example of a robot 400, according to an aspect of the present disclosure. As shown in FIG. 4, the robot 400 includes three independent drive pods 402. Two wheels 404 may be coupled to each drive pod 402 to provide locomotion to the robot 400. That is, the wheels 404 may move in a forward or backward direction based on the motors (not shown) provided within each drive pod 402. Furthermore, each drive pod 402 may rotate left or right based on the motors provided within each drive pod 402. Accordingly, the forward/backward rotation of the wheels 404 in conjunction with the right and/or left rotation of a carousel (not shown) of each drive pod 402 allows the robot 400 to move in various directions, such as forward, backwards, rotate left, rotate right, strafing left, and strafing right.

Furthermore, as shown in FIG. 4, each drive pod 402 may be coupled to an arm 406 of the robot 400. The arms 406 and drive pods 402 may be configured so that each drive pod 402 may be de-coupled from the arm 406 to improve the replacement/re-configuration of the drive pods 402. Additionally, the arms 406 are coupled to a robot body 408. The robot body 408 may house electronics, motors, and other devices (not shown) to control the robot 400. Furthermore, other attachments (not shown) may be coupled to the robot body 408. In one configuration, as shown in FIG. 4, an extendable arm 412 and claw 410 may be coupled to the robot body 408.

Furthermore, as shown in FIG. 4, each drive pod 402 is defined between the two wheels 404 so that the motors and gears coupled to the drive pod 402 are defined within the pair of wheels 404. Moreover, a single mounting shaft (not shown) extends from the drive pod 402 to connect to the arm 406 of the robot 400. Specifically, as shown in FIG. 4 a space between the two wheels 404 allows for the single mounting shaft to extend between the space of the two wheels 404 so that the drive pod 402 is coupled to the arm 406 of the robot 400.

Figure 5:
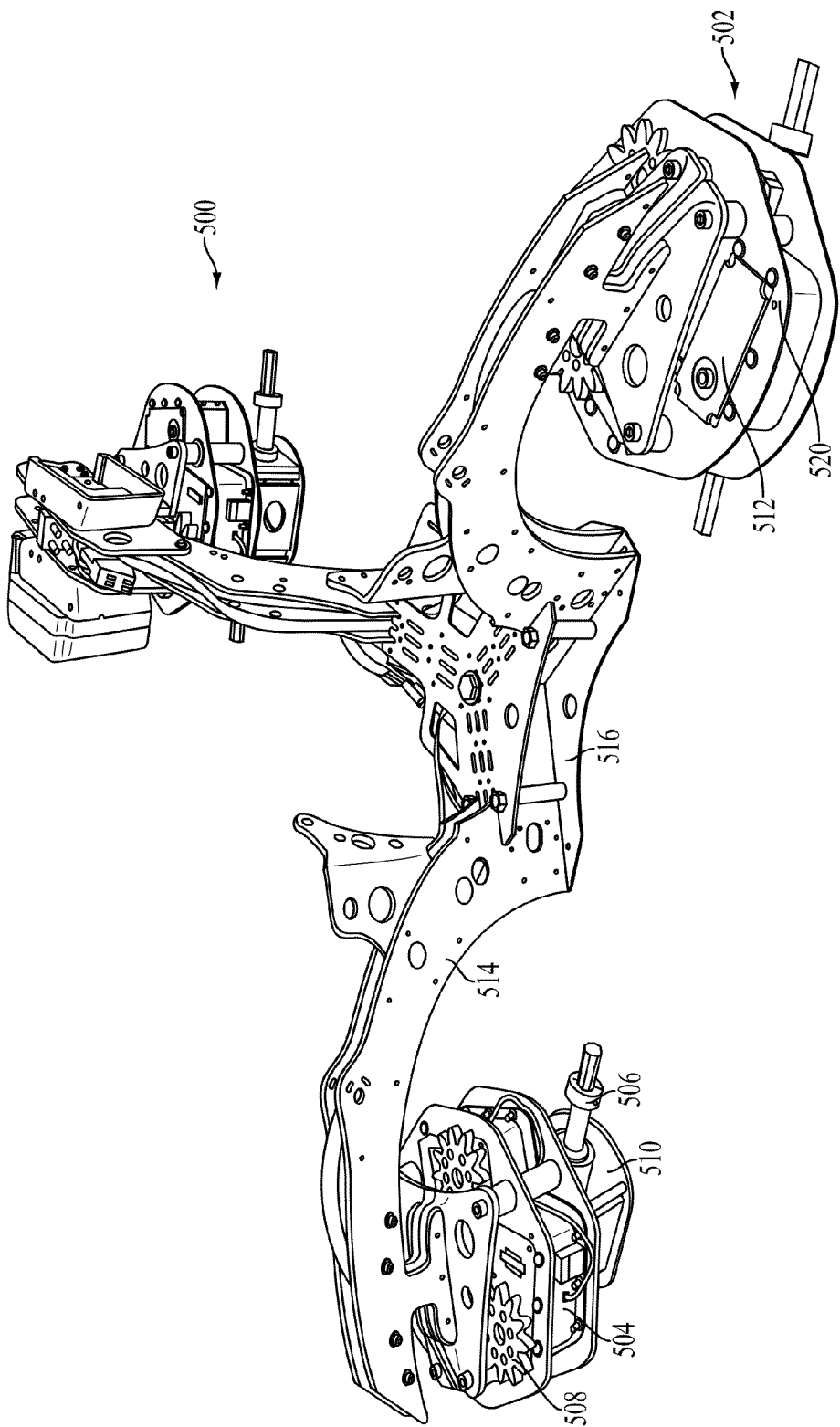
FIG. 5 illustrates an example of independent wild swerve drive pods according to an aspect of the present disclosure.

FIG. 5 illustrates an example of the robot 500 according to an aspect of the present disclosure. As shown in FIG. 5, the robot 500 includes three drive pods 502. In one configuration, two wheels (not shown) may be coupled to each drive pod 502. The wheels provide locomotion to the robot 500. Furthermore, each drive pod 502 is comprised of a carousel 510 and a housing 520. The wheels may move in a forward and/or backward direction based on the drive motors 504 provided within each housing 520. Specifically, the wheels are coupled to an axle 506 that is driven (i.e., rotates) by a drive shaft (not shown). The drive shaft is driven by drive gears 508 and drive motors 504 defined within the housing 520.

In one configuration, a carousel 510 coupled to each housing 520 may rotate left and/or right based on carousel motors 512 and carousel gears (not shown) provided within each housing 520. The carousel motors 512 and carousel gears rotating the carousel 510 right and/or left are different from the drive gears 508 and drive motors 504 rotating the wheels forward/backward. The forward/backward rotation of the wheels in conjunction with the right and/or left rotation of each carousel 510 allows the robot 500 to move in various directions, such as forward, backwards, rotate left, rotate right, strafing left, and strafing right. It should be noted that each housing 520 remains stationary while the carousel 510 moves right and/or left.

It should also be noted that in one configuration, the drive shaft is a hex shaft passing through a bearing (not shown) of the carousel gear. Specifically, the bearing mounts the carousel 510 and allows rotation of the drive shaft without inadvertently causing the carousel 510 to turn when the drive shaft is driving the axle 506.

Furthermore, as shown in FIG. 5, each drive pod 502 may be coupled to an arm 514 of the robot 500. The arms 514 and drive pods 502 may be configured so that the drive pods 502 may be independently de-coupled from the arm 514 to improve the replacement/re-configuration of each drive pod 502. Additionally, the arms 514 are coupled to a robot body 516. The robot body 516 may house electronics, motors, and other devices (not shown) used to control the robot 500.

Although aspects of the present disclosure have described both wheels of the drive pod moving in the same direction, the present disclosure also contemplates independent wheel rotation based on different motor/gear configurations, independent axles, separate drive shafts, etc. That is, one hemisphere of the wheel (e.g., left hemisphere) can move in one direction while the other hemisphere (e.g., right hemisphere) moves in the opposite direction.

Figure 6:
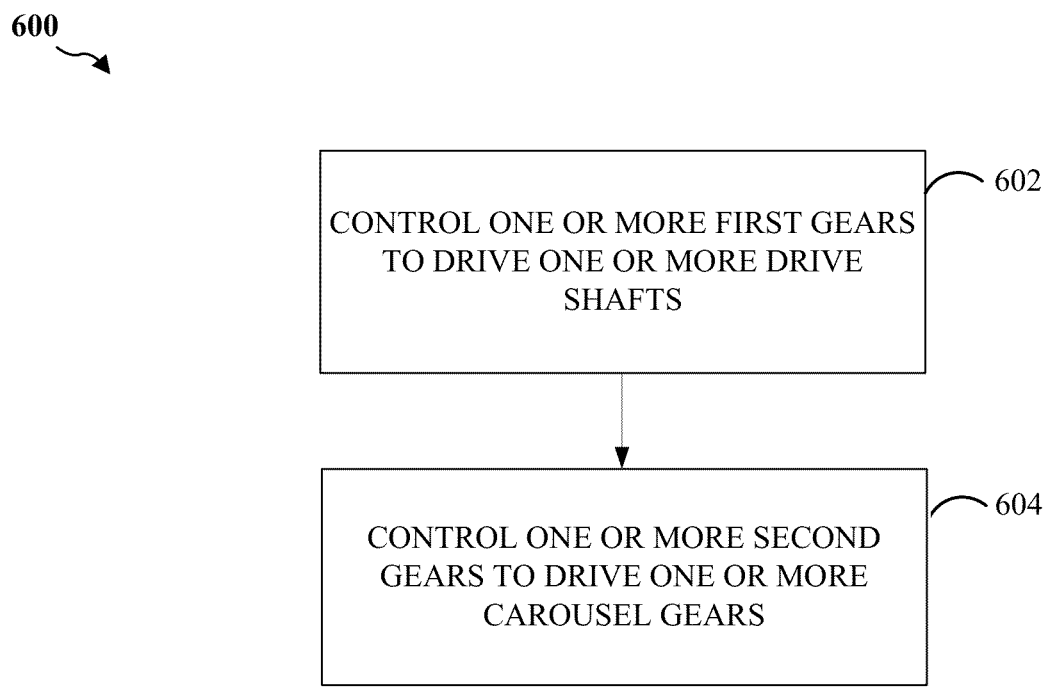
FIG. 6 is a flow diagram illustrating a method for autonomously controlling a vehicle in accordance with an aspect of the present disclosure.

FIG. 6 illustrates a block diagram 600 for autonomously controlling a robot in accordance with aspects of the present disclosure. As shown in block 602, the robot controls one or more first gears to drive one or more drive shafts. Furthermore, as shown in block 604, the robot controls one or more second gears to drive one or more carousel gears.

In one configuration, a drive pod, such as independent wild swerve drive pod 100 is configured to control a robotic device including means for controlling. In one aspect, the controlling means may be the motor 102, 104, 106, 228, 230, 302, 304, 306, 504, 512 and/or gear box 224, 226 configured to perform the functions recited by the controlling means. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. In one configuration, the robotic device includes a means for controlling. The controlling means may be the motors and/or gear boxes illustrated in FIGS. 1-5. In another configuration, the aforementioned means may be any module or any apparatus configured to perform the functions recited by the aforementioned means. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A robotic device, the robotic device comprising:
a drive pod encompassed by a plurality of wheels coupled to an axle of the drive pod;
a single mounting shaft coupled to the drive pod and configured to couple the drive pod with a body of the robotic device;
a drive shaft comprising a pinion gear configured to drive a ring gear coupled to the axle;
a plurality of first motors within the drive pod and configured to control a plurality of first drive gears coupled to a drive shaft gear of the drive pod, the drive shaft gear configured to drive the drive shaft; and
a second motor within the drive pod and configured to control a second drive gear coupled to a carousel gear of the drive pod, the carousel gear configured to rotate a carousel coupled to the drive pod in at least one direction substantially orthogonal relative to a forward direction or a reverse direction.

2. The robotic device of claim 1, in which:
the plurality of first drive gears are configured to drive the drive shaft gear; and
the plurality of wheels rotate in the forward direction or the reverse direction when the pinion gear drives the ring gear.

3. The robotic device of claim 2, in which the carousel is configured to house the axle, the carousel gear being coupled to the carousel.

4. The robotic device of claim 3, in which the second drive gear is configured to drive the carousel gear to rotate the carousel in the at least one substantially orthogonal direction relative to the forward direction.

5. The robotic device of claim 1, in which the single mounting shaft is coupled to an arm of the body.

6. The robotic device of claim 1, further comprising a plurality of the drive pods.

7. The robotic device of claim 1, further comprising a plurality of gearboxes, each gearbox being coupled to at least one gearbox gear configured to control at least one of a speed, a torque, or a combination thereof, of at least the plurality of first drive gears or the second drive gear.

8. A method of controlling a robotic device, the method comprising:
coupling a drive pod to the robotic device via a single mounting shaft;
coupling a plurality of wheels to an axle of the drive pod, such that the drive pod is encompassed by the plurality of wheels;
controlling a plurality of first motors within the drive pod to control a plurality of first drive gears coupled to a drive shaft gear of the drive pod;
controlling a second motor within the drive pod to control a second drive gear coupled to a carousel gear of the drive pod;
driving the draft shaft gear by the plurality of first drive gears to rotate a drive shaft; and
driving a ring gear coupled to the axle via a pinion gear coupled to the drive shaft.

9. The method of claim 8,
in which the plurality of wheels rotate in a forward direction or a reverse direction when the pinion gear drives the ring gear.

10. The method of claim 8, further comprising driving the carousel gear by the second drive gear to rotate a carousel in at least one substantially orthogonal direction relative to a forward direction.

11. A non-transitory computer-readable medium having program code recorded thereon for controlling a robotic device, the program code comprising:
program code to control a plurality of first motors within a drive pod to control a plurality of first drive gears coupled to a drive shaft gear of the drive pod; and
program code to control a second motor within the drive pod to control a second drive gear coupled to a carousel gear of the drive pod, the drive pod encompassed by a plurality of wheels coupled to an axle of the drive pod, and the drive pod coupled to the robotic device via a single mounting shaft;
program code to drive the draft shaft gear by the plurality of first drive gears to rotate a drive shaft; and
program code to drive a ring gear coupled to the axle by a pinion gear coupled to the drive shaft.

12. The non-transitory computer-readable medium of claim 11, in which
the plurality of wheels rotate in a forward direction or a reverse direction when the pinion gear drives the ring gear.

13. The non-transitory computer-readable medium of claim 11, in which the program code further comprises program code to drive the carousel gear by the second drive gear to rotate a carousel in at least one substantially orthogonal direction relative to a forward direction.

14. A robotic device, the robotic device comprising:
means for housing encompassed by a plurality of wheels coupled to an axle of the means for housing;
a single means for mounting coupled to the means for housing and configured to couple the means for housing with a body of the robotic device;
means for driving comprising a pinion gear configured to drive a ring gear coupled to the axle;
a plurality of first means for providing force within the means for housing and configured to control a plurality of first drive gears coupled to a drive shaft gear of the means for housing, the drive shaft gear configured to drive the means for driving; and
a second means for providing force within the means for housing and configured to control a second drive gear coupled to a carousel gear of the means for housing, the carousel gear configured to rotate a carousel coupled to the means for housing in at least one direction substantially orthogonal relative to a forward direction or a reverse direction.

* * * * *